(12) United States Patent
Benisch et al.

(10) Patent No.: US 9,996,850 B1
(45) Date of Patent: Jun. 12, 2018

(54) SAFE PIXEL

(71) Applicant: Rocket Fuel Inc., Redwood City, CA (US)

(72) Inventors: Michael Jared Benisch, Redwood City, CA (US); Mark Charles Torrance, San Jose, CA (US); Aleksei Statkevich, Redwood City, CA (US)

(73) Assignee: Rocket Fuel Inc., Redwood City, CA (US)

( * ) Notice: Subject to any disclaimer, the term of this patent is extended or adjusted under 35 U.S.C. 154(b) by 289 days.

(21) Appl. No.: 14/035,535

(22) Filed: Sep. 24, 2013

Related U.S. Application Data

(60) Provisional application No. 61/804,139, filed on Mar. 21, 2013.

(51) Int. Cl.
| | | |
|---|---|---|
| *G06Q 30/00* | (2012.01) | |
| *G06Q 30/02* | (2012.01) | |
| *H04L 29/06* | (2006.01) | |

(52) U.S. Cl.
CPC ..... *G06Q 30/0242* (2013.01); *H04L 63/1408* (2013.01)

(58) Field of Classification Search
CPC .................. G06Q 30/0242; H04L 63/1408
USPC ...................................... 705/14.47
See application file for complete search history.

(56) References Cited

U.S. PATENT DOCUMENTS

| | | | | |
|---|---|---|---|---|
| 8,433,785 B2 * | 4/2013 | Awadallah | .......... | G06F 11/3485 709/224 |
| 8,914,878 B2 * | 12/2014 | Burns | ................ | H04L 63/1441 726/13 |
| 2005/0144067 A1 * | 6/2005 | Farahat | .................. | G06Q 30/02 705/14.52 |
| 2006/0212350 A1 * | 9/2006 | Ellis | ........................ | G06Q 30/02 705/14.41 |
| 2007/0255821 A1 * | 11/2007 | Ge | .......................... | H04L 67/24 709/224 |
| 2009/0094311 A1 * | 4/2009 | Awadallah | .......... | H04L 63/1441 709/202 |
| 2012/0173315 A1 * | 7/2012 | Martini | .............. | G06Q 30/0241 705/14.4 |
| 2014/0259145 A1 * | 9/2014 | Khandelwal | ........ | H04L 63/1458 726/13 |

OTHER PUBLICATIONS

Cognition—From Memory to Creativity, Weisberg, Reeves, 2013, John Wiley & Sons, pp. 13-40, 519-527.*

(Continued)

*Primary Examiner* — David J Stoltenberg
*Assistant Examiner* — Michael I Ezewoko
(74) *Attorney, Agent, or Firm* — Fenwick & West LLP

(57) ABSTRACT

The safe pixel is code embedded in a web page that is executed when the web page is accessed by a user agent. When the safe pixel is executed, the safe pixel collects information about the device and invokes the execution of one or more abuse detection functions. Each abuse detection function implements a different technique for estimating the likelihood of abusive behavior being the cause of the safe pixel being executed. The safe pixel transmits in a reporting message the local information and the results of the abuse detection function executions to a traffic server. The traffic server analyzes the reporting message to make a determination of the validity of the action that caused the safe pixel being executed.

18 Claims, 9 Drawing Sheets

(56) References Cited

OTHER PUBLICATIONS

Noetics, Lawrence Krader, 2010, Peter Lang Publishing, pp. 551-553.*
Britannica Concise Encyclopedia, Encyclopedia Britannica, 2006, p. 537.*
Explaining Creativity, Keith Sawyer, 2006, Oxford University Press, pp. 104-105.*
The Way We Think, Fauconnier, 2010, Persues Books Group, Chapter 1, Chapter 13.*

* cited by examiner

SAFE PIXEL

CROSS REFERENCE TO RELATED APPLICATIONS

This application claims priority under 35 U.S.C. § 119(e) to U.S. Provisional Patent Application Ser. No. 61/804,139, filed Mar. 21, 2013 and entitled "Safe Pixel."

BACKGROUND

Field of Art

This disclosure generally relates to web traffic, online advertising, and particularly to page tags or pixel tags.

Description of the Related Art

Online advertising is a growing industry. Web pages often include space for content, as well as advertising space for impressions (e.g., individual instances or appearances of advertisements (ads)) presented with the hope of inducing the visitor (or user) to click on the impression and perform some desired act including, for example, visiting a specific web page, signing up for an electronic newsletter at a specific web page, or making a purchase from a specific web page. When the user performs the desired act, the user is considered to have "converted."

Advertisers collect statistics regarding traffic on web pages in order to make more informed advertising space purchase decisions. These statistics can include actions taken by users on the web pages as well as historical information about particular users such as other sites visited and actions taken. The statistics can be used to determine the web pages where advertising space is purchased, to determine more specifically which advertising space is purchased, to determine the price paid for advertising space, and also to determine which users to purchase advertising space for.

Bad actors can manipulate statistics gathered for a particular web page. Generally, bad actors accomplish this by paying a human user to generate fake user web traffic, either manually or using a computer program (or "bot") that automatically generates web traffic. The artificially increased web traffic to particular web pages can then be used by the owners of those web pages to extract higher advertising fees for advertisements placed on those web pages, even though the actual value to advertisers of these kinds of web pages is low.

SUMMARY

A safe pixel that adds to the base functionality of a pixel tag is embedded within a web page and assists in the identification of abusive behaviors directed to the web page. In operation, when the safe pixel is executed, the safe pixel collects an operating environment data set associated with a device that executes a web browser being used to access the web page. The safe pixel also invokes for execution at least one abuse detection function from a set of abuse detection functions also embedded within the web page. Each abuse detection function configured to evaluate at least one distinct factor regarding a likelihood of the web page's access being associated with abusive behavior that artificially increases traffic to the web page. The safe pixel then evaluates a result of the execution of the at least one abuse detection function to determine the likelihood of the web page's access being associated with abusive behavior, and reports that the web page was accessed to an external traffic server when the likelihood of the web page's access being associated with abusive behavior is lower than a threshold.

When the safe pixel reports that the web page was accessed, the safe pixel is deemed to have fired. The external service captures safe pixel tag firings associated with the web page to determine the overall traffic directed to the web page. Firing the safe pixel selectively when the likelihood of abusive behavior is low allows the traffic server to capture only legitimate, non-abusive traffic directed to the web page as opposed to all the traffic, which may include traffic associated with abusive behavior.

I. COMPUTING ENVIRONMENT FOR DETECTING ABUSIVE BEHAVIOR

Figure 1:
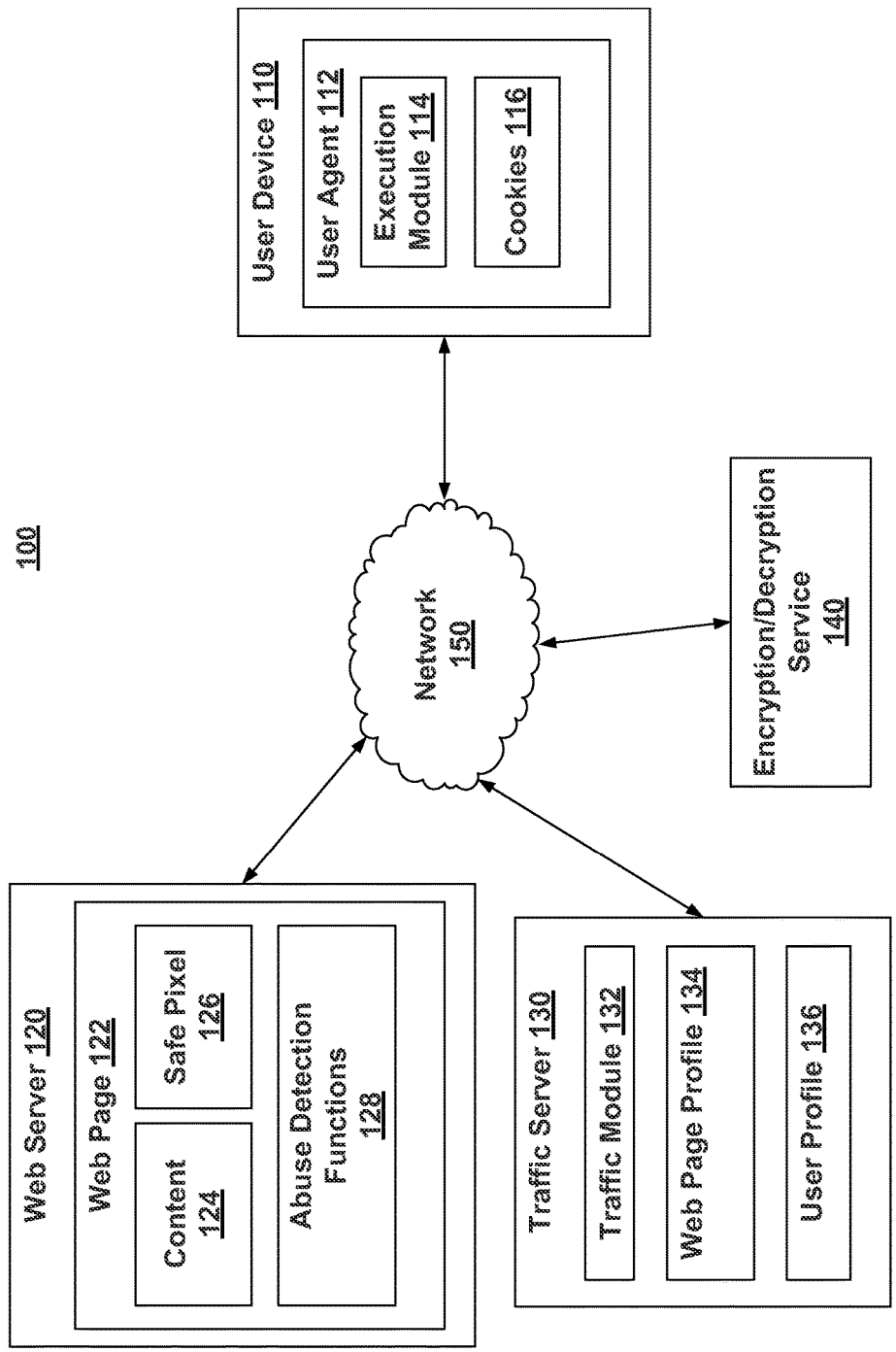
FIG. 1 illustrates a computing environment configured for identifying abusive behavior according to one embodiment.

FIG. 1 illustrates a computing environment configured for identifying abusive behavior according to one embodiment. The computing environment 100 includes a number of different computing systems including a web server 120, a traffic server 130, an encryption/decryption service 140 and a user device 110, all communicatively coupled through a communications network 150 (e.g., the internet). For example, the computing systems may be programmed to communicate with each other using a networking protocol such as transmission control protocol/internet protocol (TCP/IP). Although only one of each type of computing system is shown, in practice many of each type of entity exist on the internet, and the various instances of each type of computing systems interact with each other on a frequent basis.

A user operates a device 110 (e.g., a smart phone, tablet computer, laptop computer, personal computer, etc.) to access web pages, such as web page 122 provided by web server 120. For sake of clarity, reference to a user is a reference to the device 110, as a mechanism of abstracting away from the actual human actor or, in some cases, computer software (bot) controlling the device 110. The device 110 includes a software user agent (or web browser) 112 that enables the user to access a web page. Any given user device 110 may make use of one or more user agents to access web pages. Example of user agents include Firefox™, Chrome™, Safari™, and Internet Explorer™.

Web pages are typically HyperText Markup Language (HTML) documents composed of content and HTML elements that specify how the content should be presented. For a particular web page, the user agent 112 presents the content to the user in the manner specified by the relevant HTML elements. In some cases, a web page also includes scripts, such as JavaScript™ code, for performing certain actions. The execution module 114 is specialized software included in the user agent 112 that interprets and executes scripts embedded within web pages. In one embodiment, the execution module 114 is a scripting engine that executes JavaScript™ code embedded within the web page 122.

In many instances, the user's 110 web traffic, including page visits and actions on those visited web pages, will be locally stored in cookies 116 maintained by the user agent 112. Cookies 116 may also store other information, for example the user agent being used for browsing, version of the user agent, user identifying information such as a cookie ID and a user's IP address, and web page specific state information such as web page shopping cart information.

The web server 120 stores and transmits the web page 122 to a user device 110 in response to receiving a request from the user device 110. The web page 122 is located at particular internet addresses (e.g., at a particular uniform resource locator (URL)) that a user can access via the user agent 112. Modern web pages often dynamically respond to user interaction, such that the interaction between the web server 120 and the user device is a back and forth process. The web page 122 includes informational content 124 such as text, audio media, video media, and/or interactive software code. As discussed above, the content 124 may be associated with HTML elements that specify how the content is to be presented by the user agent 112.

The web page 122 also includes a pixel tag, herein referred to as a "safe pixel" 126, that is executed each time the web page 122 is accessed. In general, a pixel tag is code embedded in a web page that, when executed successfully, alerts an external service of the web page being accessed. When a pixel tag is successfully executed, the pixel tag is deemed to have "fired." The external service analyzes pixel tag firings associated with the web page to determine the overall traffic directed to the web page.

The safe pixel 126 adds to the base functionality of an ordinary pixel tag. The safe pixel 126 assists in the identification of abusive behaviors directed to the web page 122. Abusive behavior is any action performed that artificially increases traffic to the web page 122, with or without intent. Abusive behavior includes, but is not limited to, repetitively accessing the web page 122, repetitively clicking on links within the web page 122, and repetitively invoking the code in the web page 122. All of these actions artificially impact statistics associated with the use of the web page 122. Generally, abusive behavior comes in two varieties: real human actors who are paid to manually visit web sites and perform conversions of various types (e.g., click on impressions, view impressions) and computer programs (referred to as "bots") that automatically visit web pages and perform conversions. Not all bots are maliciously generating fake traffic, some are simply visiting web sites to search for other information. Despite their lack of malicious intent, the traffic generated by bots is still not considered valid human traffic.

When the safe pixel 126 is executed, the safe pixel 126 facilitates at least three actions: (i) collection of information about the device 110 (referred to herein as the "operating environment dataset"), (ii) invocation of one or more abuse detection functions 128 and, in some cases, (iii) transmission of a reporting message to the traffic server 130. If a reporting message is transmitted to the traffic server 130, the safe pixel 126 is deemed to have fired.

To collect the operating environment dataset (i), the safe pixel 126 invokes system calls provided by the user agent 112 or by the operating system (not shown) executing on the device 110. The local information includes but is not limited to the internet protocol (IP) address of the device 110, the type of the user agent 112, a timestamp, browsing history as indicated by the cookies 116, and, if available, an identifier associated with the entity operating the device 110.

The safe pixel 126 also includes computer code (or instructions) configured to cause the execution module 114 to invoke (ii) one or more abuse detection functions 128 to determine the likelihood of the safe pixel 126 being executed in response to abusive behavior (referred to herein as "the likelihood of abusive behavior"). In some implementations, the execution of the safe pixel 126 pauses until each of the invoked abuse detection functions 128 are fully executed. The abuse detection functions 128 are independent pieces of code from the safe pixel 126 that are included as part of the web page 122. In one embodiment, the abuse detection functions 128 are JavaScript™ code that are called by code in the safe pixel 126. The abuse detection functions 128 may be invoked serially or in parallel with each other. The abuse detection functions 128 that are selected for invocation may vary by implementation. In one embodiment, the safe pixel 126 selects abuse detection functions to be invoked based on the collected local information. For example, an abuse detection function 128 may be configured for certain types of user agents or systems, and the safe pixel 126 does not select these abuse detections when the type of user agent or system does not match the ones for which the function is configured.

Described below in conjunction with FIGS. 4-9 are several abuse detection functions. Each abuse detection function 128 evaluates at least one distinct factor regarding a likelihood of the web page's retrieval to be associated with an abusive user. When executed, some abuse detection functions 128 generate a probability indicating the likelihood of the safe pixel 126 being executed in response to abusive behavior. Other abuse detection functions 128 capture system states and/or statistics that can be further analyzed to determine the likelihood of abusive behavior. Further, some abuse detection functions 128 are configured to complete execution entirely within the user device 110. Other abuse detection functions 128 complete execution by interacting with external computing systems such as the encryption/decryption service 140.

In some instances, once the invoked abuse detection functions are executed, the safe pixel 126 determines whether to transmit a reporting message to the traffic server 130. The reporting message indicates to the traffic server 130 that the safe pixel 126 was executed. The transmission of the reporting message is referred to herein as "the safe pixel 126 being fired" or "firing of the safe pixel 126." In one embodiment, one or more of the invoked abuse detection functions 128 prevent the safe pixel 126 from firing. For example, one of the invoked abuse detection functions 128 may not complete execution before a user navigates away from the web page 122 such that the remaining code of the safe pixel 126 is never executed.

To determine whether to transmit the reporting message, the safe pixel 126 analyzes the execution results of the executed abuse detection functions to determine whether the web page 122 was accessed as a result of abusive behavior. In one embodiment, the safe pixel 126 compares the result of the invoked abuse detection functions against threshold values to make the determination. The threshold values may be statically configured or may be learned over a period of time. The safe pixel 126 may also take the type of the user agent 112 and the device 110 into account when making the determination.

When a reporting message should be transmitted, the safe pixel 126 generates a reporting message (iii) based on the collected operating environment dataset (i) and the execution result of the invoked abuse detection functions (ii). The reporting message may be in a standard format, such as XML. The safe pixel 126 transmits the reporting message to the traffic server 130.

The traffic server 130 includes a traffic module 132, web page profile 134 and user profile 136. The traffic module 132 receives and processes reporting messages received from safe pixel 126. The web page profile 134 includes information regarding views of the web page 122 and/or content within the web page 122, such as the number of visits as a function of time, information regarding the different types of user agents via which the web page 122 is accessed, the times of day that the web page 122 is accessed, the prior web page accessed before the web page 122 was accessed, etc. The user profile 136 includes the number of times and the frequency with which the web page 122 has been accessed from the device 110, the time of day that the web page is accessed from the device 110, the other web pages accessed from the device 110, the applications executing on the device 110, etc.

Upon receiving a reporting message from the safe pixel 126, the traffic module 132 analyzes the execution result of the executed abuse detection functions included in the reporting message to determine whether the safe pixel 126 was fired as a result of abusive behavior. In one embodiment, the traffic module 132 compares the result of the invoked abuse detection functions against threshold values to make the determination. The threshold values may be statically configured or may be learned over a period of time. The traffic module 132 may also take the web page profile 134 and the user profile 136 into account when making the determination. For example, there may be a higher correlation of certain device types and abusive behavior such that, when the execution of the invoked abuse detection functions indicates abusive behavior and the device 110 is of a certain device type, the traffic module 132 makes a determination of the safe pixel 126 being fired as a result of abusive behavior.

The traffic module 132 also analyzes patterns of safe pixel 126 firings over a period of time to identify unusual patterns that cannot be attributed to non-abusive behavior. A temporally consistent firing pattern is one such pattern, where safe pixels 126 are fired from the same IP address at consistent time intervals. An originating web page pattern is another such pattern, where the web page 122 is repetitively accessed directly after accessing a prominent web page. Devices that exhibit a pattern of abusive behavior or web pages that are accessed in a pattern indicative of abusive behavior may be flagged by the traffic module 130 as abusive.

In one embodiment, the traffic module 132 updates the web page profile 134 based on the information included in the reporting message regardless of whether the safe pixel 126 was fired as a result of abusive behavior. In such an embodiment, the traffic module 132 stores the likelihood of the safe pixel 126 being fired as a result of abusive behavior in conjunction with the information included in the reporting message. In an alternative embodiment, the traffic module 132 only updates the web page profile 134 based on the information included in the reporting message when the traffic module 132 determines that the safe pixel 126 was not fired as a result of abusive behavior. Updating the web page profile 134 only when the safe pixel 126 is not fired as a result of abusive behavior ensures that the web page traffic statistics associated with the web page 122 are reflective of web page accesses resulting from non-abusive behavior.

Further, if the traffic module 132 determines that the safe pixel 126 was fired as a result of abusive behavior, the traffic module 132 may take additional protective measures. The traffic module 132 may update the web page profile 134 to indicate that the web page 122 is associated with abusive behavior. If a web page 122 is known to be associated with abusive behavior, future safe pixel 126 firings are more closely scrutinized. For example, the threshold values against which results of abuse detection functions are compared may be lowered when evaluating future safe pixel 126 firings.

II. EXAMPLE SAFE PIXEL EVENT DIAGRAM AND PROCESS FLOW

Figure 2:
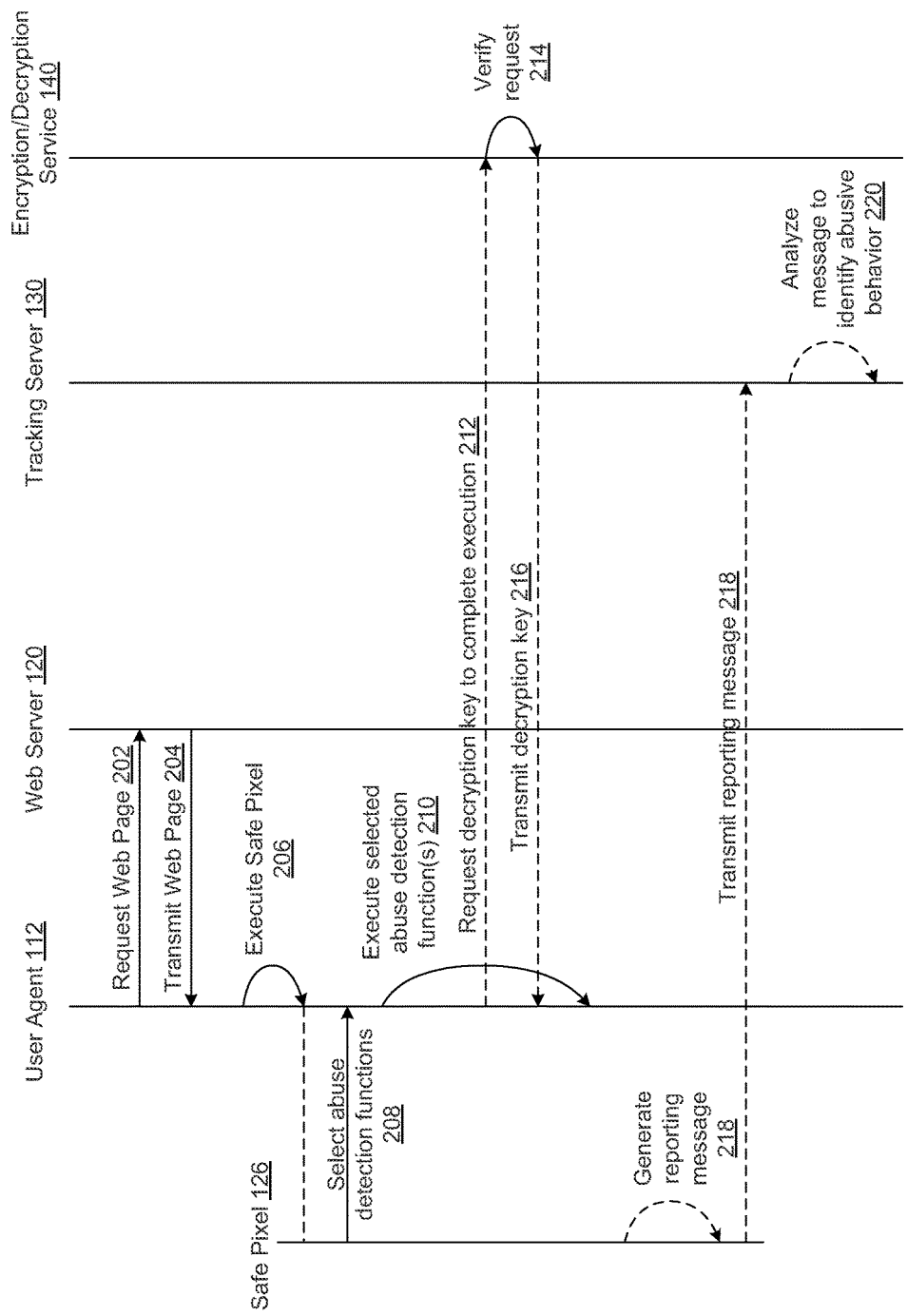
FIG. 2 is an event diagram that traces the execution of a safe pixel according to one embodiment.

FIG. 2 is an event diagram that traces the execution of safe pixel 126 according to one embodiment. As shown, the user agent 112 requests 202 the web page 122 from the web server 120 when the user agent 112 navigates to a web address associated with the web page 122. Responsive to the request, the web server 120 transmits 204 the web page 122 to the user agent 112. As discussed in conjunction with FIG. 1, the web page 122 includes content 124, the safe pixel 126 and the abuse detection functions 128.

The user agent 112, upon receiving the web page 122, executes 206 the safe pixel 126. When executed, the safe pixel 126 collects the operating environment dataset and selects 208 one or more abuse detection functions 128 for execution. In one embodiment, the safe pixel 126 selects 208 the abuse detection functions for invocation based on the operating environment dataset associated with the device 110. The user agent 112 executes 210 the selected abuse detection functions. For example, if a decryption function is invoked to obtain a key to decrypt the web address of the safe pixel 126, the decryption function may request 212 a decryption key from the encryption/decryptions service 140 to successfully complete the execution of the function. In response to receiving such a request, the encryption/decryption service 140 verifies 214 the request for authenticity. If the request is verified, then the decryption key is transmitted 216 to the user agent 112. The decryption function is described further below with respect to FIG. 4.

In some instances, once the invoked abuse detection functions are executed, the safe pixel 126 determines whether to transmit a reporting message to the traffic server 130. The reporting message indicates to the traffic server 130 that the safe pixel 126 was executed. If a reporting message is to be transmitted, the safe pixel 126 generates 218 a reporting message based on the collected operating environment dataset and the execution result of the invoked abuse detection functions. The safe pixel 126 transmits 218 the reporting message to the traffic server 130. Once the reporting message is transmitted, the safe pixel 126 is deemed to have "fired." The traffic server 130 analyzes 220 the reporting message to determine whether the safe pixel 126 was fired as a result of abusive behavior and, more generally, whether the web page 122 or the device 110 is associated with a pattern of abusive behavior.

Figure 3:
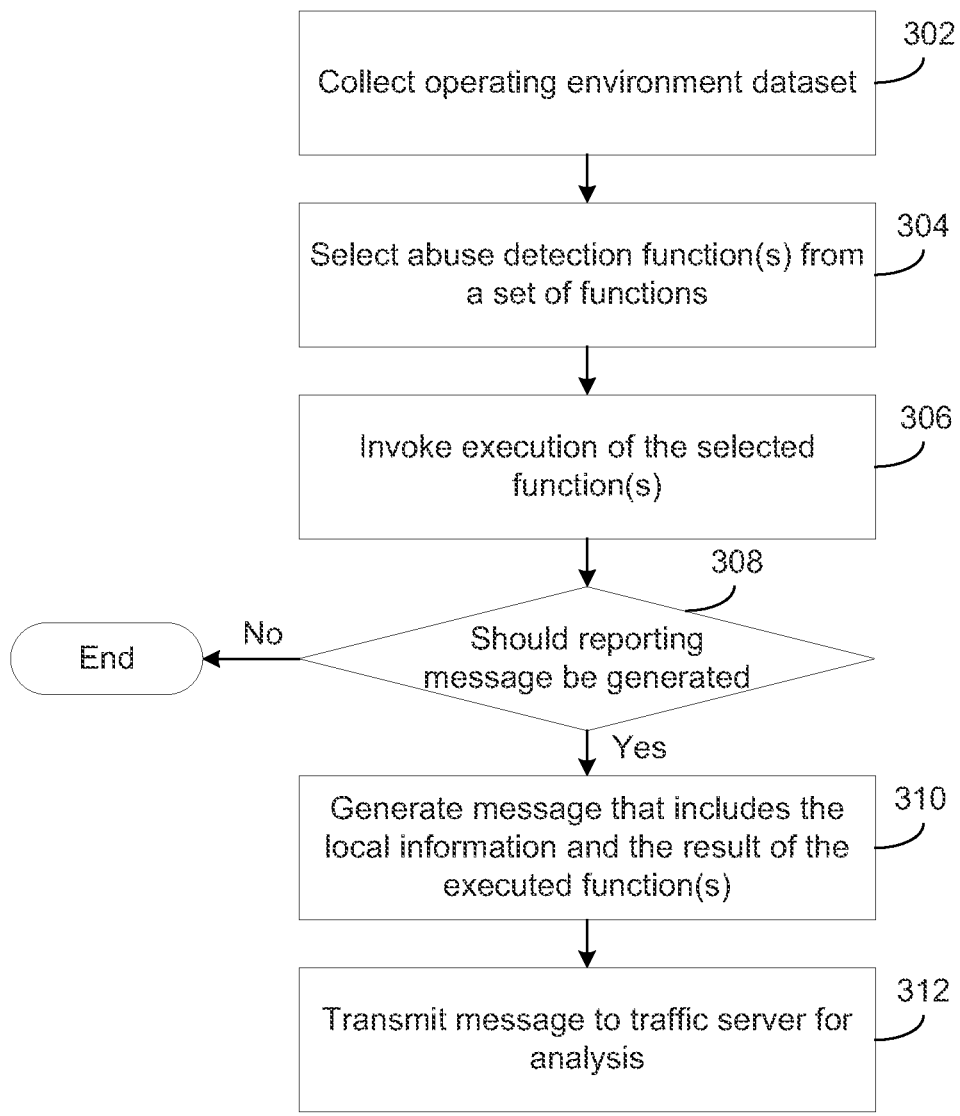
FIG. 3 is a flow diagram of method steps for identifying abusive behavior on a device that accesses the web page according to one embodiment.

FIG. 3 is a flow diagram of method steps for tracing the behavior of user device executing a safe pixel, according to one embodiment. The safe pixel 126, when fired responsive to the web page 122 being accessed via the user agent 112, collects 302 the operating environment dataset associated with the device 110 and the user agent 112.

The safe pixel 126 selects 304 abuse detection function(s) from the functions 128. The functions may be selected based on the collected operating environment dataset. For example, an abuse detection function 128 may be configured for certain types of user agents or systems, and the safe pixel 126 does not select these abuse detections when the type of user agent or system does not match the ones for which the function is configured. The safe pixel 126 invokes 306 the selected abuse detection functions for execution by the execution module 114.

The safe pixel 126 also determines 308 whether to transmit a reporting message to the traffic server 130. The reporting message indicates to the traffic server 130 that the safe pixel 126 was executed. Such a determination may be made based on the result of the execution of a different abuse detection function and/or the collected operating environment dataset. If a reporting message should not be transmitted, then the execution of the safe pixel 126 ends. If a reporting message should be transmitted, then the safe pixel 126 proceeds to 310.

The safe pixel 126 generates 310 a reporting message based on the collected operating environment dataset and the execution results of the executed abuse detection function(s). The safe pixel 126 transmits 312 the reporting message to the traffic server 130. Upon receiving the message, the traffic server 130 analyzes the execution result of the invoked abuse detection functions included in the reporting message to determine whether the safe pixel 126 was fired as a result of abusive behavior.

III. ABUSE DETECTION FUNCTIONS

Described below are a number of different abuse detection functions. These include, for example, a decryption function, an event detection function, a task evaluation function, a stalling function, a cookie setting function and an identifier function. The safe pixel 126 may invoke any or all of the functions described below to identify abusive behavior associated with a particular device and a particular access of the web page 122. If a reporting message is generated at all, depending upon the functions executed, the reporting message may include execution results for each executed function. The execution results may include likelihoods of abusive behavior and/or whether the function was successfully executed. The traffic server 130 analyzes the reporting message to determine whether the particular firing of the safe pixel 126 was a result of abusive behavior and/or whether the web page 122 or the device 110 is associated with abusive behavior patterns in general.

The likelihood of abusive behavior computed by an abuse detection function may be a numerical value within a known range, e.g., between 0 and 1, where the different values in the range represent different likelihoods of abusive behavior. In most instances, the likelihood of abusive behavior computed by a one abuse detection function is not dispositive, and the likelihood computed by each of the executed abuse detection functions are aggregated to generate an overall likelihood of abusive behavior. The aggregation function used to aggregate the likelihoods may weigh likelihoods computed by certain abuse detection functions as more indicative of abusive behavior relative to likelihoods computed by other abuse detection functions. Each function puts up a surmountable barrier to abusive behavior by identifying at least some abusive behavior, and the combination of abusive functions significantly reduces the total quantity of undesired pixel firings.

III.A. Decryption Function

One abuse detection function is a decryption function that is configured to decrypt the web address where the reporting message is sent when the safe pixel is fired. Many different types of abusive user behavior will be unable to decrypt the web address, and consequently the safe pixel will not be fired. For example, many abusive devices, such as bots, do not execute scripting code necessary to perform the decryption operation. This helps ensure set up a virtual barrier such that the safe pixel is more likely to be fired responsive to non-abusive behavior.

This abuse detection function assumes that the web address for the reporting message be present in the safe pixel in an encoded form, such decryption is required before the safe pixel 126 can be fired. The decryption function is configured to decrypt the web address with a decryption key. The decryption key may be statically stored within the safe pixel 126, within the decryption function, or it may be retrieved from the encryption/decryption service 140 as illustrated in the example of FIG. 2 above.

In various embodiments, a decryption key may be tied to one or more attributes. For example, the decryption key may be tied to an expiration date, such that if a decryption operation is executed after the decryption key has expired, the decryption operation fails (even if the operation would have succeeded prior to the expiration). The decryption key may also be tied to the user agent and/or the web address of the web page 122. In this case, if the decoding operation is executed outside of web page 122, or more generally outside the user agent currently displaying the web page 122, the decryption operation fails. In addition, the encryption/decryption service 140 may generate the decryption key for transmission based on an attribute received with a decryption key request from the user agent 112, such as a time function, a user function or a static key. If any of the attributed received with the decryption key are expired or otherwise invalid, the decryption key generated by the encryption/decryption service 140 cannot be used to successfully decrypt the critical portion of the safe pixel 126.

Figure 4:
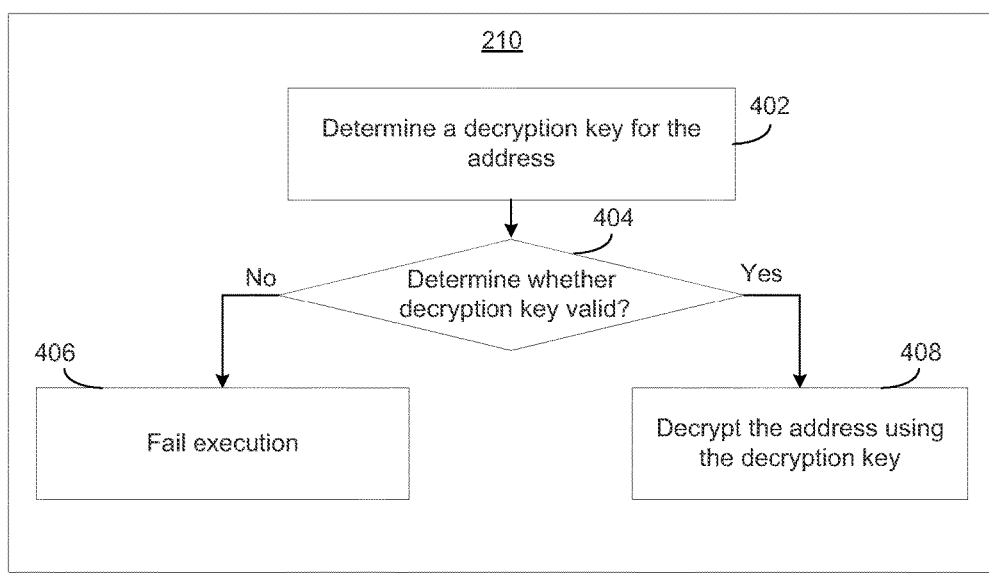
FIG. 4 is a flow diagram of method steps implemented by the address decryption function to decrypt the encrypted address of the traffic server according to one embodiment.

FIG. 4 is a flow diagram of method steps implemented by the address decryption function to decrypt the encrypted address of the traffic server 130 according to one embodiment. The decryption function determines 402 the decryption key for decrypting the address. As introduced above, the decryption key may be statically stored within the safe pixel 126, dynamically determined by the safe pixel 126, retrieved from the encryption/decryption service 140.

The decryption function then determines 404 whether the received decryption key is valid. For example, the decryption key may be associated with metadata that indicates an expiry date of the decryption key. If the decryption key is determined to not be valid, then the decryption function fails 406 the execution of the function. In one embodiment, the decryption function may raise an exception that is captured by the safe pixel 126 and indicates that the decryption operation failed. If the decryption key is determined to be valid, then the address decryption function decrypts 408 the address of the traffic server 130 using the decryption key. The address is used by the safe pixel 126 to transmit the reporting message to the traffic server 130.

Although the above description described the operation of the decryption function with respect to the web address where the safe pixel sends a reporting message, other items of information may be encoded instead. For example, rather than dictating whether the reporting message is sent, the reporting message may be sent regardless, where the content of the reporting message includes information indicating whether decryption was successful. If decryption was successful, the pixel firing may be evaluated by the traffic server 130 as being more likely to be associated with normal user behavior. Alternatively, if decryption was unsuccessful, the pixel firing may be evaluated by the traffic server 130 as being more likely to be associated with abusive behavior.

III.B. Event Detection Function

Figure 5:
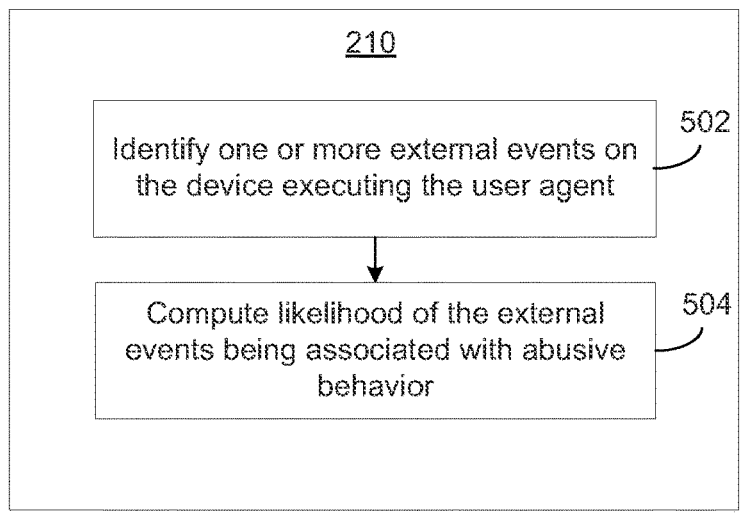
FIG. 5 is a flow diagram of method steps implemented by the event analysis function to analyze external events occurring on the device according to one embodiment.

Another abuse detection function is an event detection function that analyzes external events occurring on the device that may be indicative of a valid user. FIG. 5 is a flow diagram of method steps implemented by the event analysis function, according to one embodiment. External events analyzed by the event detection function include input device events that require human manipulation, such as mouse events and key. For example, the event analysis function may identify mouse scroll or mouse over events being performed on the web page 122. External events may also include events generated when other types of applications, such as word processing applications, game applications or music playback applications, are executed on the device 110 alongside the user agent 112. Typically, devices associated with abusive behavior do not execute consumer applications alongside the web browser being used to access websites. The event analysis function computes 504 the likelihood of the identified external events being associated with abusive behavior. The likelihood may be computed based on the type of events and the frequency of the events. For example, mouse events are typically not performed by abusive devices such that the likelihood of a mouse event being associated with abusive behavior is low.

III.C. Task Evaluation Function

Figure 6:
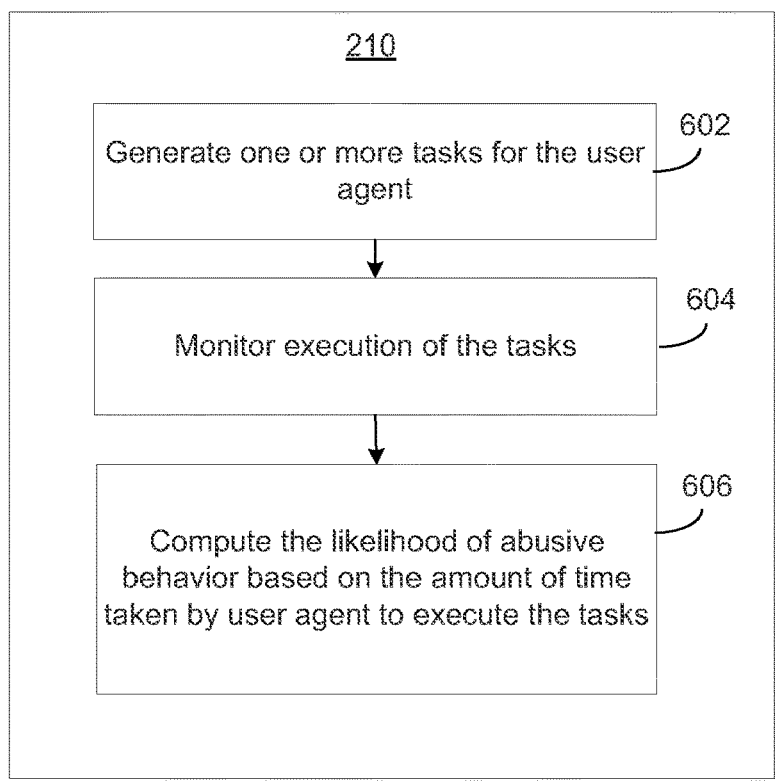
FIG. 6 is a flow diagram of method steps implemented by the task evaluation function to evaluate task execution efficiency according to one embodiment.

Another abuse detection function includes a task evaluation function that evaluates the amount of time the user agent 112 takes to perform certain tasks. FIG. 6 is a flow diagram of method steps implemented by the task evaluation function according to one embodiment. The task evaluation function generates 602 one or more tasks for the user agent 112. The task evaluation function then monitors 604 the execution of the tasks by the user agent 112. Specifically, the task evaluation function determines the amount of time the user agent 112 takes to complete the execution of the tasks. The task evaluation function computes 606 the likelihood of abusive behavior based on the amount of time taken by the user agent 112 to execute the tasks. A short amount of time is indicative of the user agent 112 executing on an abusive device, as abusive devices typically run on powerful machines that can perform tasks extremely fast relative to a general purpose computer used by an average user. Consequently, when the length of time taken to execute the tasks is below a threshold, the likelihood of abusive behavior is high. Alternatively, when the length of time taken to execute the tasks is above a threshold, the likelihood of abusive behavior is low.

In addition, the task evaluation function determines whether certain tasks were executed at all. Some tasks, such as rendering images, are typically not executed by abusive users for a variety of reasons. If such tasks are not executed, the task evaluation function may determine that the likelihood of abusive behavior is high.

III.D. Identifier Function

Figure 7:
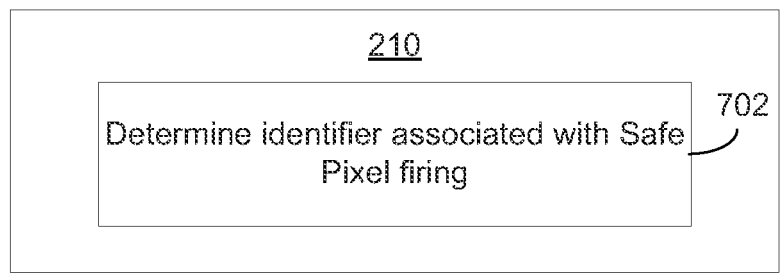
FIG. 7 is a flow diagram of method steps implemented by the identifier generating function according to one embodiment.

Another abuse detection function includes an identifier function that associates each firing of the safe pixel 126 with an identifier that is subsequently analyzed to determine patterns of web browsing behavior. FIG. 7 is a flow diagram of method steps implemented by the identifier function according to one embodiment.

The identifier function determines 702 an identifier to be associated with the reporting message transmitted to the traffic server 130. Several techniques may be used by the identifier function to determine 702 the identifier. Depending upon whether the user has been logged before in any number of ways, determining 702 the identifier may include retrieving a previously generated identifier that has already been correlated with the user. Alternatively, determining the identifier may include generating a new identifier, particularly when no existing identifier for the user is known.

In one embodiment, the identifier is generated based on the collected operating environment dataset, such as an IP address, a timestamp, the web page being served, the owner of the web page being served, the previous web page served, and/or other contextual information. In another embodiment, the identifier may have been passed in to the web safe pixel as an argument included as part of the URL of the web page that was loaded by the user agent 112. In another embodiment, at least a portion of the identifier may be received from the web server 120 when the web page 122 is requested. In such an embodiment, the identifier function may combine the received portion of the identifier with a locally generated portion of the identifier in order to generate the complete identifier.

The reporting message transmitted to the traffic server 130 by the safe pixel 126 includes the identifier. The traffic server 130 may use the identifier in order to identify pixel firings associated with abusive users and/or with non-abusive users. For example, if the number of reporting messages associated with the same identifier received by the traffic server 130 exceeds a threshold number within a time period, then the traffic server 130 may cease to recognize those messages as indicative of valid user actions. This may be accomplished, for example, by simply deleting (rather than logging) reporting messages associated with that identifier. Therefore, the traffic server 130 is able to ignore, shut off, or otherwise disregard firings of safe pixels 126 that are determined to be the result of abusive behavior.

III.E. Stalling Function

Figure 8:
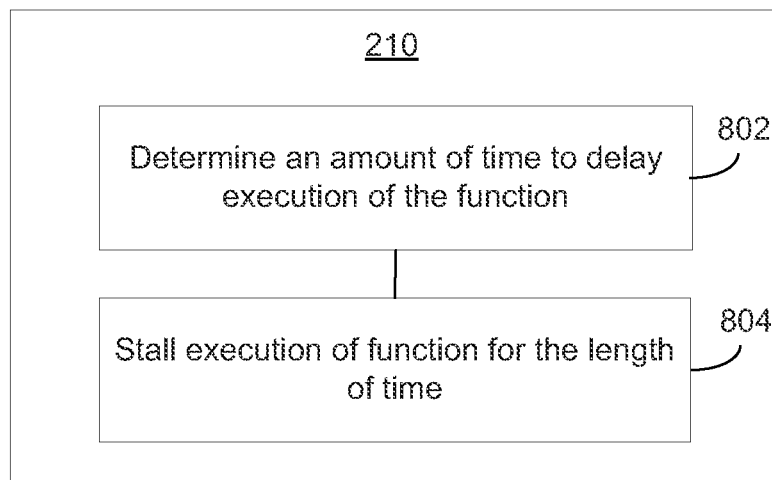
FIG. 8 is a flow diagram of method steps implemented by the stalling function to delay execution of the function according to one embodiment.

Another abuse detection function includes a stalling function configured to delay the transmission of a reporting message at least a threshold amount of time, in order to eliminate pixel firings that are generated as a result of an abusive user quickly navigating onto and off a web page to drive up the web page access count. FIG. 8 is a flow diagram of method steps implemented by the stalling function according to one embodiment.

The stalling function determines 802 an amount of time to delay execution of the function. The time of delay may be statically coded in the safe pixel. Alternatively, the time of delay may be determined based on the operating environment dataset collected by the safe pixel 126. For example, the stalling function may evaluate the frequency with which the web page is accessed via the user agent 112 to determine the time of delay. The frequency with which the web page 122 is accessed may be determined by reading a cookie associated with the web page 122 that is stored in the user agent 112. The cookie indicates the last time the web page 122 was accessed via the user agent 112.

The stalling function then stalls 804 at least a portion of the safe pixel execution for the determined amount of time. This stalled portion at least includes the sending of the reporting message. Abusive devices typically navigate on and off web pages extremely fast, much faster than a human user performing normal browsing activities. By stalling the determined amount of time, an abusive device may already have navigated away from the web page before the stalling period. As a result, execution of the safe pixel is interrupted and not completed as the user agent 112 has already been instructed by the user to load some other web page. Thus, the stalling function causes an action by an abusive device that would typically count as a successful pixel firing to instead result in the pixel not firing. The stalling period may be determined to be sufficiently long so as to give an abusive user time to navigate to a new page, but sufficiently short so as to end before a typical human user would navigate off the web page. In one embodiment, a time delay between 3 seconds and 10 seconds may be determined to be sufficiently long as to give an abusive user time to navigate to a new page and sufficiently short so as to end before a typical human user would navigate off the web page.

III.F. Cookie Setting Function

Figure 9:
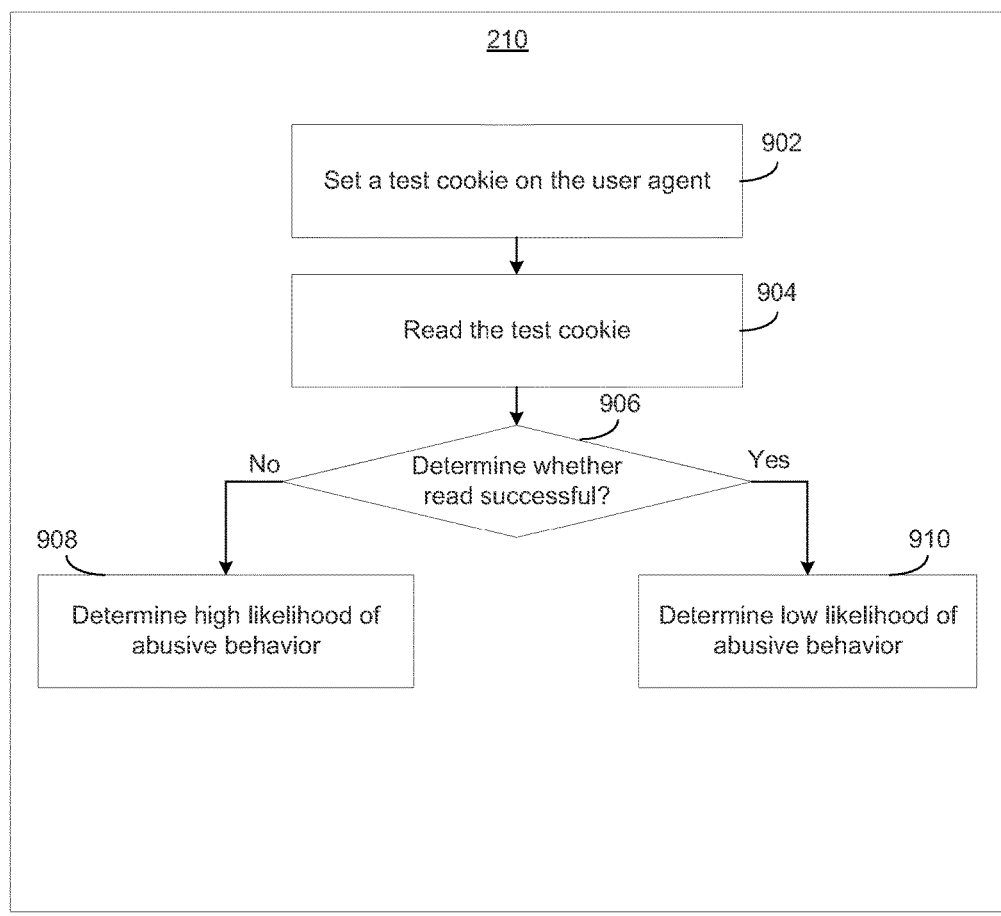
FIG. 9 is a flow diagram of method steps implemented by the cookie setting function to determine whether the user agent accepts cookies according to one embodiment.

Another abuse detection function includes a cookie setting function that determines whether the user agent 112 accepts cookies. The cookie setting function assumes that particular instances of user agents 112 that do not accept cookies may be associated with abusive devices, if those user agents in general are known to accept cookies depending upon their configuration. FIG. 9 is a flow diagram of method steps implemented by the cookie setting function according to one embodiment. The cookie setting function attempts to set 902 a test cookie on the user agent and then subsequently attempts to read 904 the test cookie. The cookie setting function then determines 906 whether the setting action was successful based on the result of the read. If the read is unsuccessful, then the cookie setting function determines 908 a higher likelihood of abusive behavior. If the read is successful, then the cookie setting function determines 910 a lower likelihood of abusive behavior.

In some implementations, the user agent 112 does not support cookies in any instance (e.g., Safari™). If the user agent 112 does not support cookies, the safe pixel 126 does not select the cookie setting function for execution as the result of the cookie setting function would be meaningless.

IV. SAFE PIXEL IN ADVERTISING

Safe pixels help ensure that the statistics collected as a result of safe pixels being successfully fired represent, to the best extent possible, the actions of real human users rather than the actions of abusive actors. Identifying abusive behavior directed at a web page is important in many contexts. In online advertising, for example, advertisement space on a web page that is trafficked by abusive users is less valuable to advertisers relative to advertisement space on web page that is trafficked by non-abusive abusive users. Also, identifying web page accesses by abusive users as opposed to non-abusive users enables advertisers to direct their advertising budgets toward legitimate and valuable web page accesses.

Figure 10:
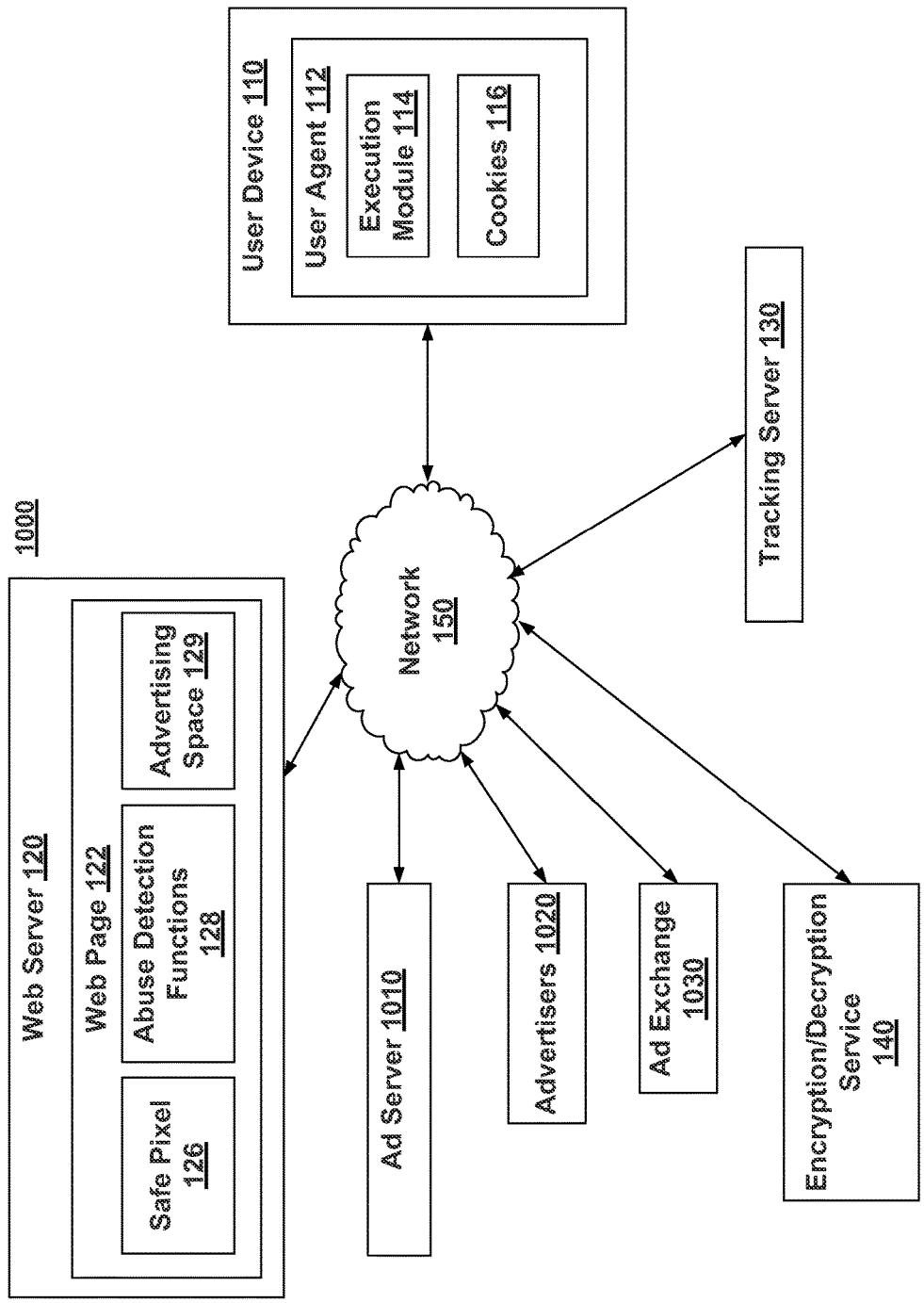
FIG. 10 illustrates a computing environment configured for online advertising according to one embodiment.

FIG. 10 illustrates a computing environment configured for online advertising according to one embodiment. The computing environment 1000 includes a number of different computing systems including the web server 120, the traffic server 130, the encryption/decryption service 140 and the user device 110 of FIG. 1. The computing environment 1000 also includes the advertisement (ad) server 1010, advertisers 1020 and an ad exchange 1030. The computing systems in computing environment 1000 all communicatively coupled through a communications network 150 (e.g., the internet) of FIG. 1.

In operation, the web server 120 owner sells advertising space 129 on its web pages 122 to advertisers 1020 as a source of revenue. There are several different mechanisms for a web server 120 to sell advertising space 129 for their web pages 122. As one example, the web server 120 may contract with an ad exchange 1030 that brokers the sale of advertising space 129. This reduces the burden on the web server 120 in managing the sale of its advertising space 129. The ad exchange 1030 then auctions the advertising space 129 in real time responsive to a user's 110 request for a web page 122. The ad exchange 1030 sends bid requests to an ad server 1010 notifying the ad server 1010 of the auction and requesting a bid to purchase the auctioned ad space 124. The ad server 1010, acting on behalf of advertisers 1020, optionally bids for the auctioned advertising space 129. The winning bidder wins the right to place an impression of an advertisement in the advertising space 129 that is presented to the user as part of the web page 122. This auction, bid, and placement process occurs in real time, and is referred to as real time bidding (RTB).

Generally, ad servers 130 try to purchase advertising space 129 that is valuable to advertisers 1020. There are many different strategies for determining what an advertiser 1020 considers valuable, and often the ad server 1010 will work with the advertiser 1020 to determine an advertising campaign strategy dictating which advertising space 129 the ad server 1010 will buy. To assist in the determination of whether (and how much) to bid on the ad space 129, the ad server 1010 may transmit a request to the traffic server 130 for information regarding the likelihood of any given web page 122 being associated with abusive behavior and/or the likelihood of the user requesting the web page being an abusive user. As discussed above, the traffic server 134 determines such likelihoods, at least in part based on the reporting messages received as a result of safe pixel firings on web pages 122 that include safe pixel code. These likelihoods may also be based on other information, for example based on other web traffic associated with identifiers transmitted as part of safe pixel reporting messages. Advertisement space on a particular web page that is being presented to a particular user where either the user or the web page has a high likelihood of being associated with abusive behavior may not be as valuable to the advertisers 1020 relative other advertisement spaces on other web pages, and/or relative to the web page traffic of other users.

IV. ADDITIONAL CONSIDERATIONS

Figure 11:
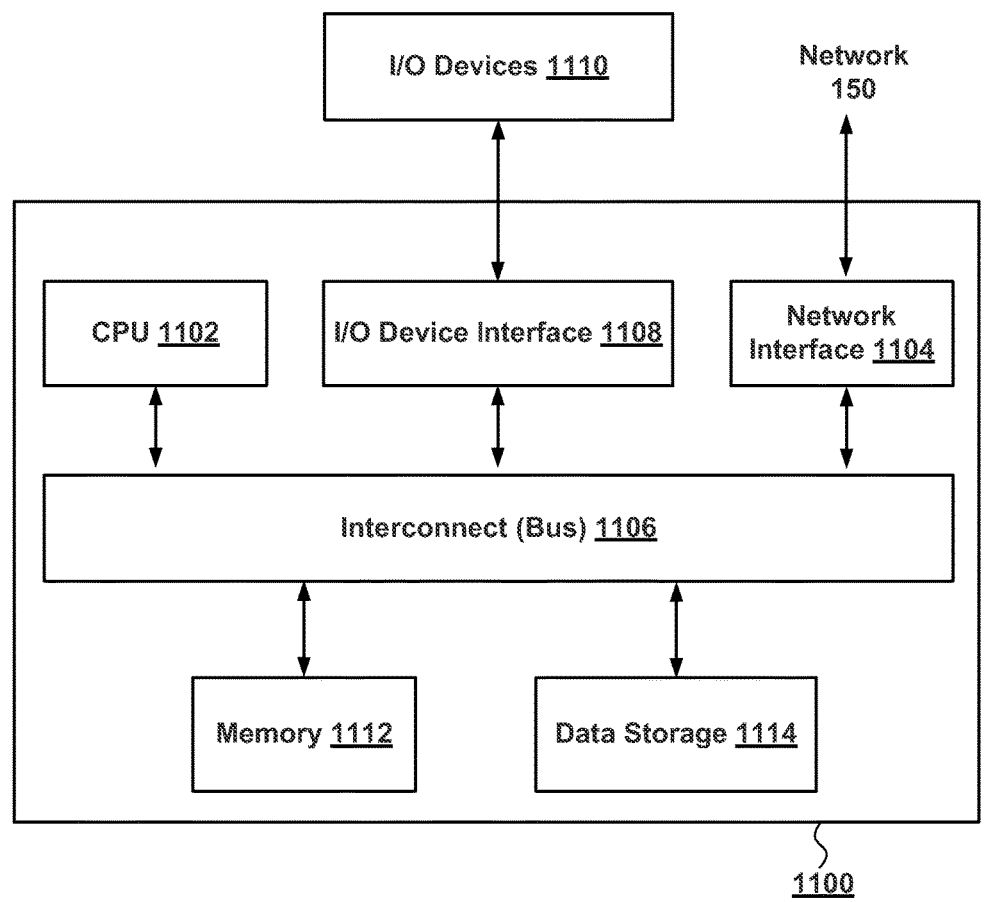
FIG. 11 is a block diagram of a computer for implementing an ad server, user device traffic server, and/or encryption/decryption service according to one embodiment.

FIG. 11 is a block diagram of a computer 1110 for implementing an ad server, a user device, a traffic server, and/or an encryption/decryption service according to one embodiment. Each type of computing system may include one or more of each conventional component, e.g., a central processing unit (CPU) 1102, system memory 1112, a data storage 1114, input/output (I/O) devices 1111 such as a mouse and a keyboard coupled through a I/O device interface 1108, output devices such as a monitor, and a network interface 1104 for communicating with other computing systems through network 1110.

The CPU 1102 retrieves and executes programming instructions and application data stored in the memory 1112 and generally controls and coordinates operations of other system components. The interconnect bus 1106 is used to transmit programming instructions and application data between the CPU 1102, I/O devices interface 1108, storage 1114, network interface 1104, and memory 1112. The memory 1112 is generally included to be representative of a random access memory and, in operation, stores software applications and data for use by the CPU 1102. The data storage 1112 may be a combination of fixed and/or removable storage devices, such as fixed disc drives, floppy disc drives, hard disk drives, flash memory storage drives, tape drives, removable memory cards, CD-ROM, DVD-ROM, Blu-ray, HD-DVD, optical storage, network attached storage (NAS), or a storage area-network (SAN) configured to store non-volatile data.

Various embodiments may be implemented as a program product (e.g., computer code, instructions) for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to embodiments of the present invention, other and further embodiments may be devised without departing from the basic scope thereof, and the scope thereof is determined by the claims that follow.

The invention claimed is:

1. A non-transitory computer readable medium comprising instructions that, when executed by a processor of a device, cause the processor to perform the steps of:
   collecting, within the device upon the instructions having been received as part of a web page by a web browser operating on the device, an operating environment data set associated with the device executing the web browser being used to access the web page;
   invoking for execution by the device at least one abuse detection function from a set of abuse detection functions, each abuse detection function configured to evaluate at least one distinct factor regarding a likelihood of the web page's access being associated with abusive behavior that artificially increases traffic to the web page;
   evaluating, by the device, a result of the execution of the at least one abuse detection function to determine the likelihood of the web page's access being associated with abusive behavior;
   responsive to the likelihood of the web page's access being associated with abusive behavior being lower than a threshold likelihood of being associated with abusive behavior, reporting, from the device to an external traffic server, that the web page was accessed; and
   responsive to the likelihood of the web page's access being associated with abusive behavior being higher than a threshold likelihood of being associated with abusive behavior, preventing reporting to the external traffic server that the web page was accessed.

2. The non-transitory computer readable medium of claim 1, wherein the at least one abuse detection function comprises computer code configured to:
   identify an event that has occurred on the device;
   determine whether the event requires human manipulation of an input device coupled to the device; and
   generate a result that indicates that the likelihood of the web page's access being associated with abusive behavior is low when the event requires human manipulation or that the likelihood of the web page's access being associated with abusive behavior is high when the event does not require human manipulation.

3. The non-transitory computer readable medium of claim 1, wherein the at least one abuse detection function comprises computer code configured to:
   determine whether the device executes a consumer application different from the web browser; and
   generate a result that indicates that the likelihood of the web page's access being associated with abusive behavior is low when the device executes a consumer application different from the web browser or that the likelihood of the web page's access being associated with abusive behavior is high when the device does not execute a consumer application different from the web browser.

4. The non-transitory computer readable medium of claim 3, wherein the consumer application is a word processing application, a music playback application or a game application.

5. The non-transitory computer readable medium of claim 1, wherein the at least one abuse detection function comprises computer code configured to:
   generate one or more tasks for execution on the device;
   evaluate a length of time taken by the device to execute the one or more tasks; and
   generate a result that indicates that the likelihood of the web page's access being associated with abusive behavior is high when the length of time is less than a threshold length of time or that the likelihood of the web page's access being associated with abusive behavior is low when the length of time is greater than or equal to the threshold length of time.

6. The non-transitory computer readable medium of claim 1, wherein the at least one abuse detection function comprises computer code configured to:
   determine that the web browser allows cookies to be set;
   set a test cookie on the web browser;
   determine whether the test cookie can be read from the web browser; and
   generate a result that indicates that the likelihood of the web page's access being associated with abusive behavior is high when the test cookie cannot be read or that the likelihood of the web page's access being associated with abusive behavior is low when the test cookie can be read.

7. The non-transitory computer readable medium of claim 1, further comprising instructions that cause the processor to perform the steps of generating an identifier associated with the device, and reporting the that the web page was accessed in association with the identifier.

8. The non-transitory computer readable medium of claim 7, wherein the traffic server determines based on the identifier whether the web page was previously accessed by the device, and determines that the web page's access is associated with abusive behavior when a number of times the web page was previously accessed by the device exceeds a threshold number of times.

9. The non-transitory computer readable medium of claim 1, further comprising instructions that cause the processor to perform the steps of invoking for execution a second abuse detection function from the set of abuse detection functions, the second abuse detection function comprises computer code configured to wait a length of time before completely executing, and reporting that the web page was accessed to the external traffic server is stalled until the second abuse detection function is completely executed.

10. A method comprising:
  retrieving, by a web browser operating on a device, a web page comprising computer code, the computer code comprising a pixel tag and a set of abuse detection functions; and
  executing, by the web browser at the device, computer code of the pixel tag comprising instructions that cause the web browser to:
    collect an operating environment dataset comprising a type of the web browser; select at least one of the abuse detection functions from the set of abuse detection functions for execution based on the operating environment dataset, each abuse detection function configured to evaluate at least one distinct factor regarding a likelihood of the web page's access being associated with abusive behavior that artificially increases traffic to the web page;
    execute, by the web browser at the device, the at least one selected abuse detection function;
    determine, by the web browser at the device, a likelihood of the web page's access being associated with abusive behavior based on the execution of the at least one selected abuse detection function;
    responsive to the likelihood of the web page's access being associated with abusive behavior being lower than a threshold likelihood of being associated with abusive behavior, generate, by the web browser at the device, a reporting message based on a result of the execution of the at least one abuse detection function; and
    transmit, by the web browser at the device, the reporting message to an external traffic server; and
    responsive to the likelihood of the web page's access being associated with abusive behavior being higher than a threshold likelihood of being associated with abusive behavior, prevent reporting to the external traffic server that the web page was accessed.

11. The method of claim 10, wherein the at least one abuse detection function comprises computer code configured to:
  identify an event that has occurred on the device;
  determine whether the event requires human manipulation of an input device coupled to the device; and
  generate a result that indicates that the likelihood of the web page's access being associated with abusive behavior is low when the event requires human manipulation or that the likelihood of the web page's access being associated with abusive behavior is high when the event does not require human manipulation.

12. The method of claim 10, wherein the at least one abuse detection function comprises computer code configured to:
  determine whether the device executes a consumer application different from the web browser; and
  generate a result that indicates that the likelihood of the web page's access being associated with abusive behavior is low when the device executes a consumer application different from the web browser or that the likelihood of the web page's access being associated with abusive behavior is high when the device does not execute a consumer application different from the web browser.

13. The method of claim 12, wherein the consumer application is a word processing application, a music playback application or a game application.

14. The method of claim 10, wherein the at least one abuse detection function comprises computer code configured to:
  generate one or more tasks for execution on the device;
  evaluate a length of time taken by the device to execute the one or more tasks; and
  generate a result that indicates that the likelihood of the web page's access being associated with abusive behavior is high when the length of time is less than a threshold length of time or that the likelihood of the web page's access being associated with abusive behavior is low when the length of time is greater than or equal to the threshold length of time.

15. The method of claim 10, wherein the at least one abuse detection function comprises computer code configured to:
  determine that the web browser allows cookies to be set;
  set a test cookie on the web browser;
  determine whether the test cookie can be read from the web browser; and
  generate a result that indicates that the likelihood of the web page's access being associated with abusive behavior is high when the test cookie cannot be read or that the likelihood of the web page's access being associated with abusive behavior is low when the test cookie can be read.

16. The method of claim 10, further comprising generating an identifier associated with the device, and transmitting the reporting message in associated with the identifier.

17. The method of claim 16, wherein the traffic server determines based on the identifier whether the web page was previously accessed by the device, and determines that the web page's access is associated with abusive behavior when a number of times the web page was previously accessed by the device exceeds a threshold number of times.

18. The method of claim 10, wherein the pixel tag computer code further comprises instructions that cause the web browser to invoke for execution a second abuse detection function from the set of abuse detection functions, the second abuse detection function comprises computer code configured to wait a length of time before completely executing, and wherein the transmission of the reporting message is stalled until the second abuse detection function is completely executed.

* * * * *